June 2, 1970  G. C. CUSITER ET AL  3,515,007

GYROSCOPE DAMPING MECHANISM

Filed Feb. 23, 1968  2 Sheets-Sheet 1

INVENTORS
GEORGE C. CUSITER
CHARLES S. WHALEN

BY *Edgar O. Rost*

ATTORNEY

INVENTORS
GEORGE C. CUSITER
CHARLES S. WHALEN
ATTORNEY

United States Patent Office

3,515,007
Patented June 2, 1970

3,515,007
GYROSCOPE DAMPING MECHANISM
George C. Cusiter, Lexington, and Charles S. Whalen, Danvers, Mass., assignors to Raytheon Company, Lexington, Mass., a corporation of Delaware
Filed Feb. 23, 1968, Ser. No. 707,678
Int. Cl. G01c 19/42
U.S. Cl. 74—5.5                             1 Claim

ABSTRACT OF THE DISCLOSURE

A rate or rate-integrating gyroscope instrument having a constant damping ratio over a full ambient temperature range including a self-regulating mechanism of a deformable compensating member and cooperating cam actuator-piston assembly for controlling the flow of a viscous damping fluid disposed in the region between the gimbal assembly and the case in response to angular displacement of the gimbal assembly and fluid expansion.

---

The invention herein described was made in the course of or under a contract or subcontract thereunder, with the Department of the Navy.

BACKGROUND OF THE INVENTION

The rate or rate-integrating gyroscope is by definition a single-degree-of-freedom gyroscope having a primary elastic restraint of the spin axis about the output axis. The gimbal assembly which supports a motor-rotor assembly may be angularly displaced relative to the gyroscope case by appropriate means such as an electrical feedback loop, torque motor, torquer, or spring to apply a desired restoring force to the gimbal assembly. In the application of gyroscopes, particularly in airborne applications, such devices may be mounted with the gyroscope case connected to the vehicle. Motions of the vehicle about, for example, the input axis which is perpendicular to both the spin and output axes will produce precession of the gyroscope gimbal assembly whose bearings are mounted along the gyroscope output axis. Conventionally, such single-axis gyroscopes may be utilized to sense and independently control the orientation of three axes in the navigation of the airborne vehicle. To achieve the degree of accuracy required in such applications the dynamic response of the instrument must be controlled by providing satisfactory damping between the gimbal assembly and the gyroscope case to assure the damping out of transient oscillations. Viscous shear control has been utilized in the past to provide such damping. A fluid, however, disposed in the region between the gimbal assembly and the gyroscope case together with a means for pumping said fluid with control is preferred in present day gyroscopes.

Another application of the subject invention is in the so-called rate-integrating gyroscope. With strong viscous damping a torque value coupled with the gyroscopic torque may be utilized in navigation systems as an indication of the gimbal output angle rate. Since the output angle of the gimbal assembly is proportional to the tilt of the gyroscopic case about the input axis, small angular deflections furnish intelligence signals regarding the attitude of the applicable vehicle which may be utilized to accurately control movement of airborne vehicles about the roll, pitch and azimuth axes. Greater precision may be realized with the mounting of individual single-axis rate gyroscopes for sensing each of the vehicle attitudes rather than a single unitary inertial gyroscope having several degrees of freedom of movement.

In both of the foregoing gyroscopic devices control of the damping factor over a wide environmental range is a prime prerequisite since fluid volume change is directly proportional to temperature variation. Compensation for such temperature variations have resulted in most prior art gyroscopes being provided with internal heaters as well as damping rings fabricated from certain synthetic materials noted for strength and elasticity over a wide temperature range such as, for example, nylon. The need for the provision of appropriate power sources for such heaters may be undesirable, particularly in airborne applications where the power sources are already heavily taxed. A need, therefore, exists in the field of single-axis gyroscopes for the provision of improved damping to further enhance the quality and precision of the final product over a wide temperature range.

SUMMARY OF THE INVENTION

The present invention provides a gyroscopic device having a substantially constant damping ratio over a full ambient temperature range without resorting to the employment of internal heaters to compensate for damping fluid variations. A deformable compensating bellows assembly cooperating with a linearly actuated cam actuator serves a dual function of access for the expansion of fluid through temperature variation and supplying the movement necessary to actuate a plurality of mechanical piston members which control the damping fluid flow and torque. The gimbal assembly supporting the motor-rotor assembly in the present device includes a plurality of radially disposed paddle members position within recesses having substantially the same configuration and an adjacent port opening between recesses for the flow of the damping fluid. When the gyroscope device experiences a rate of turn about the input axis the gimbal assembly will be actuated to turn through a small angle, perhaps only a few degrees. The paddle members located within the individual recesses will experience the rate of return and force the damping fluid through the controlled openings in the ports between adjacent paddles. A pumping action is thereby achieved and the mechanical means supported by the compensating bellows assembly in cooperation with the cam actuator permits self-regulation of this pumping action as well as the fluid expansion caused by wide temperature variations. When the viscosity of the fluid is at its minimum point the cam actuator on which the spring controlled piston members ride will be fully extended to their outer limits and restrict the volume of fluid moving between adjacent ports. At the opposite end of the temperature range when the viscosity of the fluid is at its greatest in a lower temperature environment the gimbal paddle ports will open to the widest opening to accommodate the volume of fluid to be displaced by the gimbal assembly movement.

A self-regulating feature of the compensating bellows actuated assembly resides in the fact that the surface of the cam actuator is shaped so as to control the paddle port openings at substantially the same rate at which the damping fluid viscosity changes with temperature. An inherent control over the damping ratio limits is thus achieved. The embodiment of the invention readily lends itself to high volume production assembly through the utilization of appropriate tooling and predetermined settings for the damper control mechanism disclosed herein.

BRIEF DESCRIPTION OF THE DRAWINGS

The invention, as well as the specific details of the construction of a preferred embodiment, will now be described, reference being directed to the accompanying drawings in which.

DESCRIPTION OF THE PREFERRED EMBODIMENT

Figure 1:
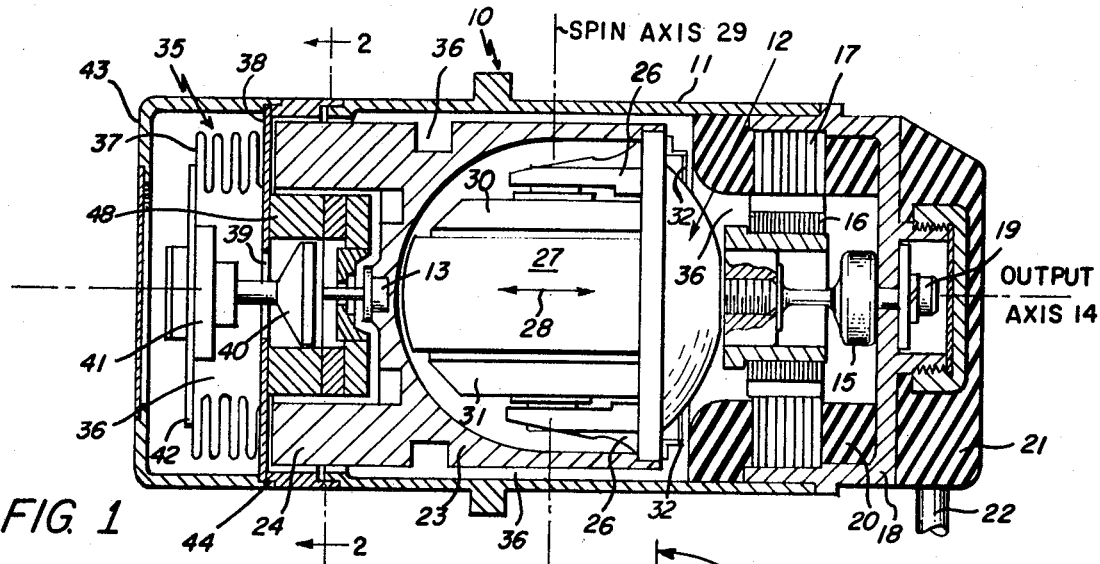
FIG. 1 is a longitudinal cross-sectional view of the embodiment of the present invention.

Referring now to the drawings, particularly FIG. 1, the illustrative embodiment 10 of a rate gyroscope is enclosed within case member 11. The main gyro motor and rotor assembly is supported by the gimbal and motor yoke assembly 12. This assembly is provided at an end with a jewel pivot bearing 13 disposed along the output axis designated by the numeral 14. The input axis would then be perpendicular to axis 14 in a direction directed into the paper. At the opposite end of the assembly a torsion bar 15 and electrical pickoff rotor 16 in cooperation with companion stator coils 17, such as a microsyn of the variable reluctance type, provides for an angular displacement of the assembly 12 in a direction extending circumferentially around the output axis 14. In this manner the gimbal of the rate gyroscope may assume its proper attitude proportional to the angular rate seen by its input axis and yields an electrical signal by means of rotor pickoff assembly. End cover member 18 supports the torsion bar member 15 by means of screw cap 19. The pickoff assembly is suitably insulated by means of a conventional potting compound in the areas designated by the numeral 20. A similar potting material is utilized at the outer end of case member 18 and designated by the numeral 21. This insulates all the electrical leads of the internal components of the gyroscope connected to external actuating circuitry through cable 22. The individual wires have not been illustrated herein for the sake of clarity and in view of the fact that such techniques are well known in the art.

The gimbal and motor yoke assembly 12 includes the opposing shaft holders 26 which provide for the rotation of the rotor-motor assembly and a housing member 23. The rotatable member of the gyroscope is the motor rotor 27 which rotates in the direction indicated by the arrow 28 about the spin axis 29. The rotor 27 assembly includes opposed ball bearing members 30 and 31 which provide for rotation about the internally supported stationary motor stator windings conventionally employed in gyroscopic devices of the type under consideration. The leads for the motor stator are positioned on housing 23 as shown and designated by the numeral 32.

At the opposing end of housing member 23 a plurality of projecting paddle members 24 are circumferentially disposed. Each paddle member is positioned within a recess opening in a wall member of the piston housing assembly as will be hereinafter described.

The self-regulating damping assembly including a cam actuator and piston control means is disposed at the paddle member end of the overall gyroscope assembly and is indicated generally by the numeral 35. This mechanism controls the rate of flow of the viscous damping fluid which is disposed in the cavities surrounding the paddle members 24 and in the region of the case as designated by the numeral 36. A suitable fluid for the damping operation comprises any of the well known silicone fluids readily commercially available. A deformable compensating bellows member 37 is secured to a plate member 38 which is in turn secured to the case member 11.

An aperture 39 in plate member 38 provides for the flow of the fluid into the chamber defined by the bellows. A cam actuator member 40 threadably engages adapter member 41 secured, as by soldering, welding or brazing, to end plate member 42 which is in turn secured to the outer convolutions of the bellows member 37 to define a fluid tight chamber. A cover member 43 encloses the self-regulating damping mechanism and is cemented or soldered to the gyroscope case 11 defining a shoulder arrangement 44.

Figure 2:
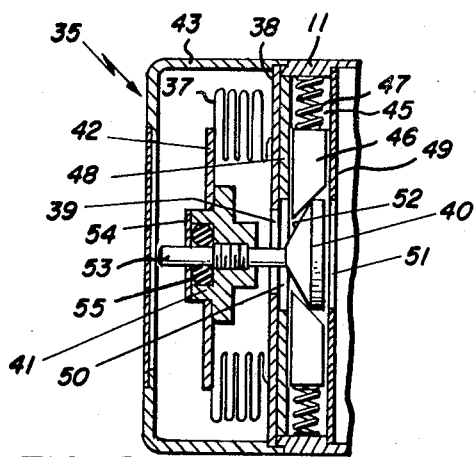
FIG. 2 is a detailed cross-sectional view of the section of the overall embodiment designated by the lines 2—2 in FIG. 1 rotated approximately 90°.

Referring now to FIG. 2, the assembly 35 has been shown with the foregoing described components similarly numbered and the view is rotated approximately 90° from that shown in FIG. 1 to reveal the cooperating spring controlled piston assembly. Pistons 46 are urged downwardly to contact the cam actuator 40 by means of springs 47. A piston guide plate 48 provides a series of upright bars 59 to define a slot to channel the movement of each of the individual piston members as well as a series of port openings 45. The opposing surface of each piston member contacts a piston retaining the fluid flow restriction plate member 49. Both the guide plate 48 and member 49 are suitably secured to the inner wall surfaces of the case member 11. An aperture 50 in guide plate 48 and another aperture 51 in member 49 are provided for the flow of the damping fluid. Spring actuated piston members 46 then are radially disposed about the cam actuator member 40 which moves in a linear direction under the control of the bellows 37 while the piston members move in a mutually perpendicular direction. The tapered wall surfaces 52 of cam actuator 40 are in contiguous engagement with the piston members 46 and this wall surface is configured to control the port openings for the passage of fluid at substantially the same rate at which the fluid viscosity changes with variations in the ambient temperature. The shaft 53 of cam actuator 40 is provided at its outer end with a slot to facilitate the initial setting of the self-regulating mechanism to the desired predetermined damping characteristics for, illustratively, room ambient temperature. After such setting the shaft 53 is cut flush with the outer wall surfaces of adapter 41 and an end cap 54 together with O-ring member 55 and a suitable cement will seal in a fluid tight manner this end of the mechanism.

Figure 3:
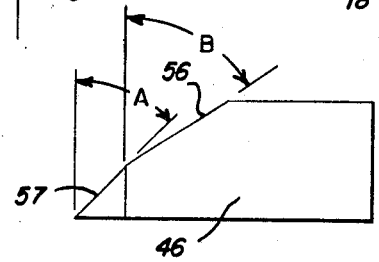
FIG. 3 is an enlarged side elevational view of the piston member of the cam actuator cooperating mechanism.
Figure 4:
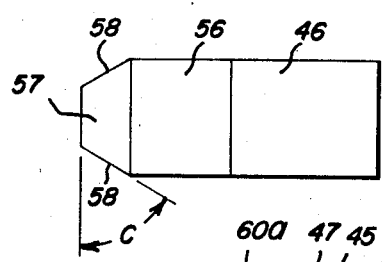
FIG. 4 is an enlarged plan view of the same member shown in FIG. 3.

Referring now to FIGS. 3 and 4, an enlarged view of the individual piston members is shown. An inclined bevel surface 56 extends over a major portion of the tip surface and may illustratively have an angle of approximately 56° for the dimension indicated by the arrow B. Another bevel surface is provided as indicated by the numeral 57 and an illustrative value would be approximately 45° for the dimension indicated by the arrow A. In addition, a chamber is provided as indicated by the wall surface 58 having a value of approximately 60° for the dimension indicated by the arrow C. In accordance with good machine shop practice, all burrs are desirably removed and hardening as well as the provision of a substantially smooth finish is preferred. In some applications it may be desirable to contour the inclined bevel surface of the individual piston members to assume the configuration of a curved surface. Any desirable surface which enables the piston members to track the linear movements of the cam actuator as determined by fluid viscosity changes without binding or lockup should suffice in the practice of the teachings of the present invention.

Figure 5:
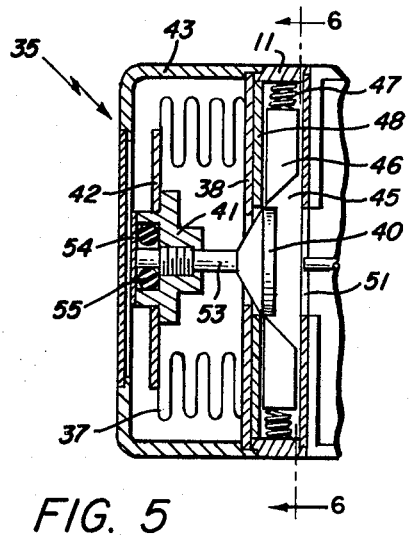
FIG. 5 is a cross-sectional view similar to that shown in FIG. 2 with the movable components of the damper mechanism shown in the high temperature limit setting.
Figure 6:
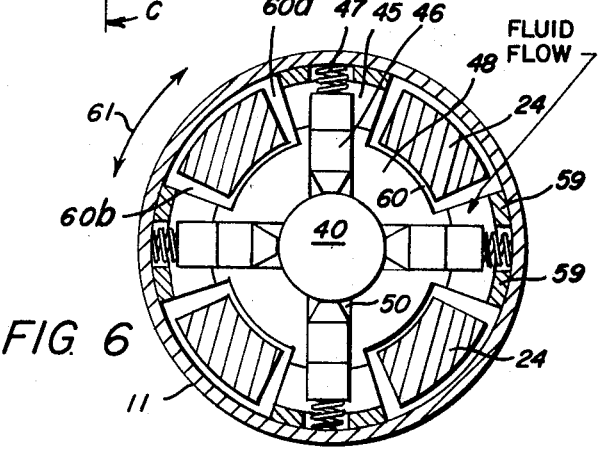
FIG. 6 is a detailed cross-sectional view taken along the line 6—6 in FIG. 5.

Turning next to FIGS. 5 and 6, the operation and features of the embodiment of the invention will now be described. It is of course understood that where applicable all components heretofore described have been similarly numbered and designated. The disposition of the self-regulating mechanism components in the high temperature limit setting is now illustrated. The cam actuator 40 is linearly disposed in such a manner that the spring loaded piston members 46 are fully extended and almost touching the inner wall surfaces of the outer case member 11. The movement is controlled entirely by the bellows 37 and the end cap 54 is touching the wall surfaces of the cover member 43. In FIG. 6 the full import of the disposition of the components is illustrated. In the hot environment when the viscosity of the fluid is minimum the entire volume of fluid expands within the gyroscope case and the ports are substantially closed to restrict flow of fluid.

It will be noted that the piston guide plate 48 defines a plurality of substantially wide recesses 60 having a configuration substantially similar to that of the individual paddle members 24. In the movement of the overall gimbal and motor yoke assembly 12 about the output axis 14, as indicated by the arrow 61, the damping fluid is disposed between the leading and trailing edges of the paddle members 24. Hence, if the rotation is in a clockwise manner an amount of fluid is forced from the side of the recess designated 60a which provides a space for increased volume on the side designated by the numeral 60b. It will thus be evident that the self-regulating mechanism serves a dual function of providing for suitable damping as the gimbal assembly is rotated about the output axis as well as the provision for expansion of the damping fluid due to ambient temperature fluctuations. A substantially constant pumping action is therefore provided about the paddle members which will effectively dampen any transient oscillations.

Figure 7:
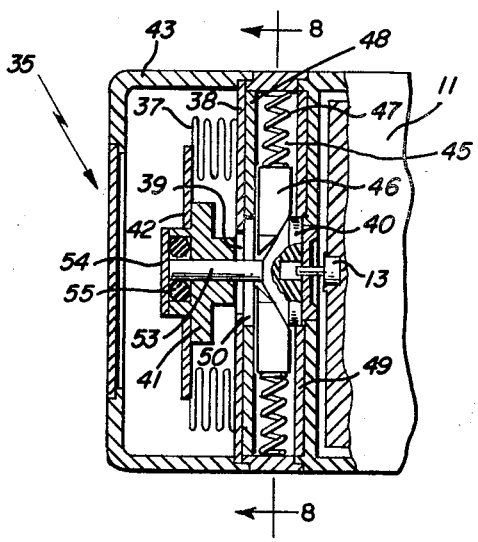
FIG. 7 is a detailed cross-sectional view similar to that shown in FIG. 2 with the movable components of the invention at the low temperature limit setting.
Figure 8:
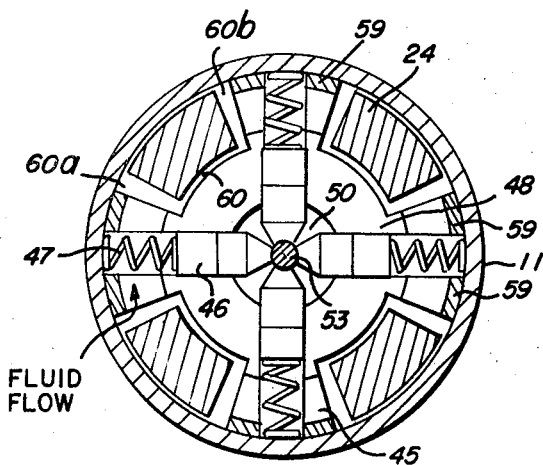
FIG. 8 is a cross-sectional view along the line 8—8 in FIG. 7.

The opposite extreme or the cold temperature setting is illustrated in FIGS. 7 and 8. The cam actuator member 40 has now moved linearly to its furthermost point in contiguous relation with the pivot bearing member 13. A substantial restriction in the flow of damping fluid through opening 51 in plate 49 is effected. At this lower temperature setting the viscosity of the damping fluid has now reached its maximum value and the requisite pumping action as well as damping of the transient oscillations will be substantially restricted to the area defined by the recesses 60 and area 36 in the case. In this view the compensating bellows member 37 has been compressed by reason of fluid contraction and has fully opened ports 45 permitting easier flow of fluid between adjacent recesses. A capability of handling a rather substantial range of temperature fluctuations is therefore provided. In working embodiments of the invention currently in use such ranges may extend from −35° F. to 180° F.

In measuring the efficiency of the rate gyroscope under such operating conditions, the damping ratio which may be defined as the ratio of actual damping to critical damping is a present day evaluation means for the description of structure attenuating the gimbal and motor yoke assembly oscillations. In a large number of the applicable gyroscopes without internal heaters to compensate for temperature fluctuations, damping ratios of about 10.0 to 1.0 are commonplace. With the incorporation of the self-compensating structure disclosed herein damping ratios of 2.0 to 1.0 over the aforementioned temperature range have been realized. It will thus be noted that the present invention will yield an approximate five-fold improvement over prior art damping means in rate gyroscopes.

While the specific illustrative embodiment has been shown and described herein, it is intended that this description be considered as exemplary only and not in a limiting sense in the interpretation of the broader aspects of the invention.

What is claimed is:

1. A rate gyroscope comprising:
a case member;
rotor means;
a gimbal and motor yoke bearing assembly disposed within said case and supporting said rotor means for unlimited rotation about a first axis;
a plurality of paddle members projecting at one end of said bearing assembly;
viscous fluid means for damping angular movement of said bearing assembly disposed within said case member;
mechanical self-regulating means for controlling the flow of said fluid over a wide range of ambient temperature variations;
said mechanical means including a deformable bellows arrangement supporting a linearly movable cam actuator member;
means defining wall structure having a plurality of radially disposed slots and channels and notched recesses adapted to accommodate said paddle members disposed therebetween;
a plurality of spring-loaded movable piston members disposed within said slots and channels and contacting the outer surfaces of said cam actuator member to thereby in reciprocating manner control the dimensions of the area between said recesses and the flow of fluid adjacent said paddle members as said cam actuator is linearly actuated;
the total distance of travel of said piston members being controlled by the contour of the contiguous surface of said piston members in relation to said cam actuator with said contour being determined to track the changes in fluid viscosity with variations in ambient temperature;
and said piston members are provided with an inclined beveled surface having a value of approximately 50° to 60° with relation to a reference plane extending perpendicular to said inclined surface over a major portion thereof contacting said cam actuator and an inclined beveled surface of approximately 45° with relation to the same plane over the remainder of said tip surface.

References Cited
UNITED STATES PATENTS

| | | | |
|---|---|---|---|
| 2,864,256 | 12/1958 | Haagens et al. | 74—5.5 |
| 2,955,472 | 10/1960 | Krupick et al. | 74—5.5 |
| 3,136,163 | 6/1964 | Haagens | 74—5.5 |
| 3,222,936 | 12/1965 | Talbot et al. | 74—5.5 |
| 3,237,459 | 3/1966 | Borg | 74—5.5 |
| 3,347,104 | 10/1967 | Boothroyed | 74—5.5 |
| 3,353,415 | 11/1967 | Tiplitz et al. | 74—5.5 |

FRED C. MATTERN, Jr., Primary Examiner

M. A. ANTONAKAS, Assistant Examiner